(12) United States Patent
Klicpera (10) Patent No.: US 11,966,812 B2
(45) Date of Patent: Apr. 23, 2024

(54) ACCELEROMETER ACTIVATED RETENTION SYSTEM FOR BARCODE SCANNING DEVICES

(71) Applicant: ZEBRA TECHNOLOGIES CORPORATION, Lincolnshire, IL (US)

(72) Inventor: Christopher P. Klicpera, Hoffman EstWestburyates, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 47 days.

(21) Appl. No.: 17/875,671

(22) Filed: Jul. 28, 2022

(65) Prior Publication Data
US 2024/0037359 A1 Feb. 1, 2024

(51) Int. Cl.
*G06K 7/14* (2006.01)
*G01P 15/18* (2013.01)
*G06K 7/10* (2006.01)

(52) U.S. Cl.
CPC ............ *G06K 7/1413* (2013.01); *G01P 15/18* (2013.01); *G06K 7/10881* (2013.01); *G06K 2007/10524* (2013.01)

(58) Field of Classification Search
CPC .. G06K 7/1413; G06K 7/10881; G06K 7/109; G06K 2007/10524; G01P 15/18
USPC ............ 235/462.44, 462.45, 462.43, 462.01, 235/462.47, 472.01
See application file for complete search history.

(56) References Cited

U.S. PATENT DOCUMENTS

| | | | |
|---|---|---|---|
| 8,186,597 B1 * | 5/2012 | Fletcher | G06K 7/10881 235/462.43 |
| 8,566,183 B1 * | 10/2013 | Bonar | G06Q 10/08 705/28 |
| 9,825,476 B2 * | 11/2017 | Mazzone | H02J 50/10 |
| 2007/0017997 A1 * | 1/2007 | Talley | G06K 7/10881 235/462.43 |
| 2008/0290170 A1 | 11/2008 | Blake et al. | |

(Continued)

OTHER PUBLICATIONS

International Search Report and Written Opinion for International Application No. PCT/US2023/27727 mailed on Oct. 6, 2023.

*Primary Examiner* — Edwyn Labaze
(74) *Attorney, Agent, or Firm* — Yuri Astvatsaturov (57) ABSTRACT

Scanning systems are disclosed herein. An example scanning system includes a cradle and a barcode scanner. The cradle includes a cradle cavity portion, a cradle controller, a force sensor communicatively coupled therewith, and a first securing feature positioned at or near the cradle cavity portion and being communicatively coupled with the cradle controller. The barcode scanner includes a housing having a scanner housing cavity, an imaging assembly adapted to capture an image of an environment appearing in a field of view (FOV) and being at least partially disposed within the scanner housing cavity, a scanner controller adapted to control operation of the imaging assembly, and a second securing feature. In response to the force sensor sensing vibration exceeding a threshold value and/or the cradle being mounted in a predetermined orientation, the first and second securing features selectively interact to retain the barcode scanner within the cradle cavity portion.

16 Claims, 4 Drawing Sheets

(56) References Cited

U.S. PATENT DOCUMENTS

| | | | |
|---|---|---|---|
| 2010/0127661 A1* | 5/2010 | Stocking | H02J 7/0044 |
| | | | 320/115 |
| 2015/0245421 A1 | 8/2015 | Heczko | |
| 2016/0034055 A1* | 2/2016 | Utykanski | G06F 3/03543 |
| | | | 235/462.13 |
| 2016/0094070 A1* | 3/2016 | Mazzone | H02J 7/0044 |
| | | | 320/115 |
| 2018/0285613 A1 | 10/2018 | Volta et al. | |
| 2021/0097522 A1 | 4/2021 | Martin et al. | |
| 2021/0111580 A1* | 4/2021 | Barkan | G06K 7/10881 |

\* cited by examiner

ACCELEROMETER ACTIVATED RETENTION SYSTEM FOR BARCODE SCANNING DEVICES

BACKGROUND

Barcode and other scanning devices generally capture images of environments within a given field of view (FOV). Handheld scanners may be used in a number of environments and may be coupled with docking cradles in generally horizontal and/or generally vertical orientations. For example, barcode scanners may be positioned in warehouse or similar environments where they are coupled with a docking cradle that may provide for retention of the scanner in addition to data transfer and/or charging capabilities. Such cradles may be disposed on movable machinery such as, for example, a forklift (e.g., to a support beam, the dashboard region, or adjacent to the operator's seat). When such cradles and scanning devices are arranged in the vertical orientation, a retaining feature may be implemented to prevent the scanner from inadvertently decoupling and falling from the cradle. While sufficiently strong retaining features capable of withstanding excessive vibrations experienced in forklift environments are desirable, removal of the devices from the scanner is oftentimes difficult and may require the use of both of the user's hands. Further, such retaining features may make removal of the scanning device difficult in the event the cradle is later repositioned in the horizontal orientation. Further still, in the event that the docking cradle is not mounted to a structure while in the horizontal orientation, it may inadvertently be picked up or otherwise moved when attempting to undock the scanner.

In some implementations, mechanical retaining systems may be used that incorporate spring-loaded retention mechanisms. As previously noted, such mechanisms may be difficult to remove the scanner from the cradle and in some instances may additionally result in difficulty securing the device thereto.

Accordingly, there is a need for improved accessories having improved functionalities.

SUMMARY

Scanning systems are disclosed herein. An example scanning system includes a cradle and a barcode scanner. The cradle includes a cradle cavity portion, a cradle controller, a force sensor communicatively coupled therewith, and a first securing feature positioned at or near the cradle cavity portion and being communicatively coupled with the cradle controller. The barcode scanner includes a housing having a scanner housing cavity, an imaging assembly adapted to capture an image of an environment appearing in a field of view (FOV) and being at least partially disposed within the scanner housing cavity, a scanner controller adapted to control operation of the imaging assembly, and a second securing feature. In response to the force sensor sensing vibration exceeding a threshold value and/or the cradle being mounted in a predetermined orientation, the first and second securing features selectively interact to retain the barcode scanner within the cradle cavity portion.

In a variation of this embodiment, one of the first or the second securing features includes a magnetic element, and the other of the first or the second securing features includes a magnetic or ferrous material. In some of these examples, the magnetic element is an active electromagnetic element and/or an electropermanent magnet. In some forms, one of the first or the second securing features includes a latch, and the other of the first or the second securing features includes a cavity adapted to at least partially receive the latch.

In these and other examples, in response to the force sensor sensing vibration exceeding excessive value and/or the cradle being mounted in a predetermined orientation, the cradle controller causes the first securing feature to activate. In some approaches, the force sensor may be in the form of an accelerometer. Further, in some examples, the force sensor may communicate with the cradle controller via a wireless communication protocol.

In accordance with a second embodiment, a cradle is provided that is adapted to interface with a barcode scanner having a second securing feature that includes a cradle housing, a cradle controller, a force sensor communicatively coupled with the cradle controller, and a cradle securing feature. The cradle housing has a cradle cavity portion adapted to receive the barcode scanner. The cradle securing feature is communicatively coupled with the cradle controller. In response to the force sensor sensing a vibration exceeding a threshold value and/or the cradle being mounted in a predetermined orientation, the cradle controller causes the cradle securing feature to activate to retain the barcode scanner within the cradle cavity portion of the cradle housing.

In accordance with a third embodiment, an approach for selectively retaining a barcode scanner within a cradle cavity of a cradle is provided that includes providing a cradle including a cradle cavity portion, a cradle controller, a force sensor communicatively coupled with the cradle controller, and a first securing feature positioned at or near the cradle cavity portion and being communicatively coupled with the cradle controller. Further, a barcode scanner is provided that includes a housing having a cavity, an imaging assembly adapted to capture an image of an environment appearing in a field of view (FOV), the imaging assembly being at least partially disposed within the cavity of the housing, a scanner controller adapted to control operation of the imaging assembly, and a second securing feature. The force sensor senses vibration exceeding a threshold value and/or the cradle being mounted in a predetermined orientation. In response to the force sensor sensing vibration exceeding a threshold value and/or the cradle being mounted in a predetermined orientation, the cradle controller or the scanner controller activates the first or second securing feature to engage the respective second or first securing feature to retain the barcode scanner within the cradle cavity portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a handheld scanning system is provided that includes a retention mechanism or securing feature to selectively secure a scanner with a cradle or base. The scanning system uses a sensor to determine when to retain and/or release the scanner from the cradle. Notably, the system described herein does not require a user to configure the device during installation or use while alleviating the problem of difficult removal of the scanner when used in industrial environments requiring relatively strong retention mechanisms.

Figure 1:
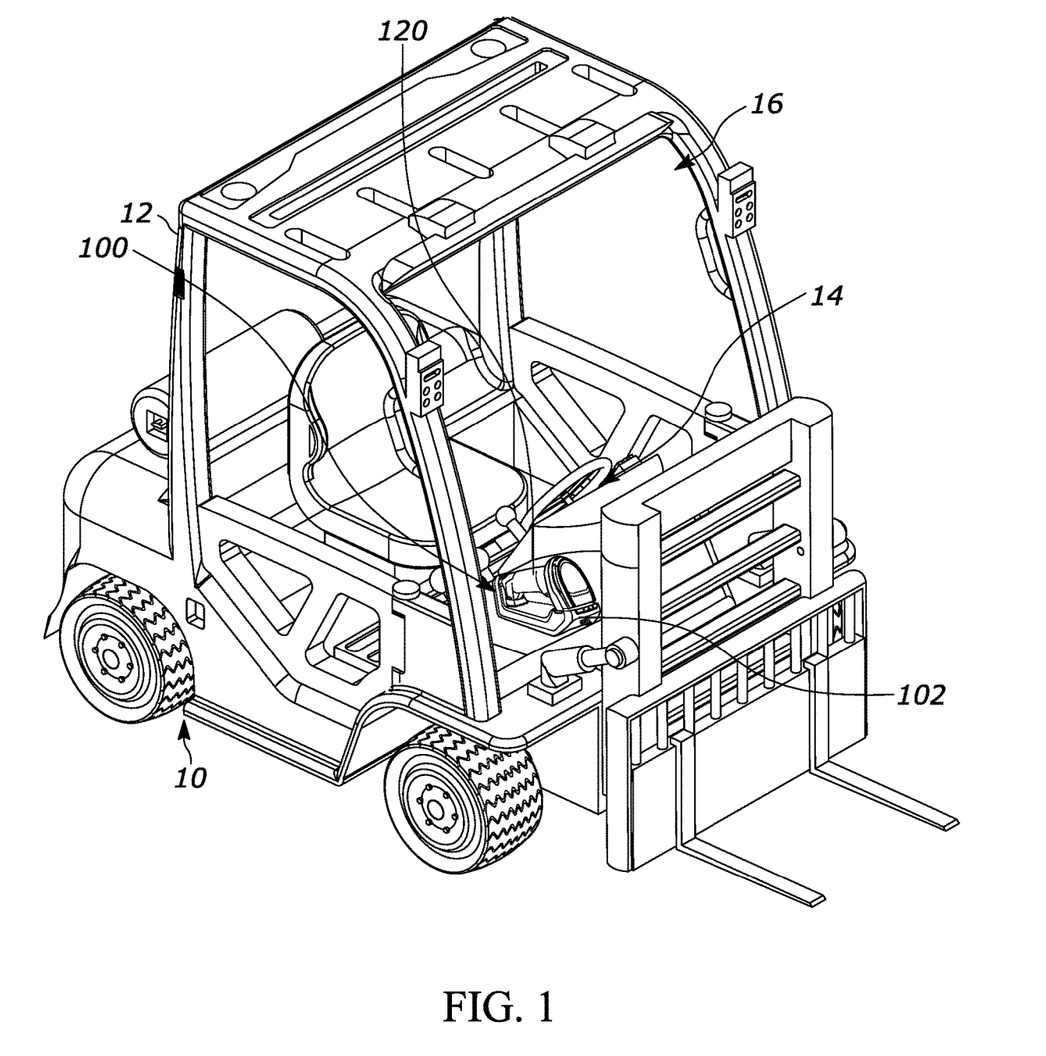
FIG. 1 illustrates a schematic view of an example environment having an example scanning system in accordance with various embodiments.
Figure 2:
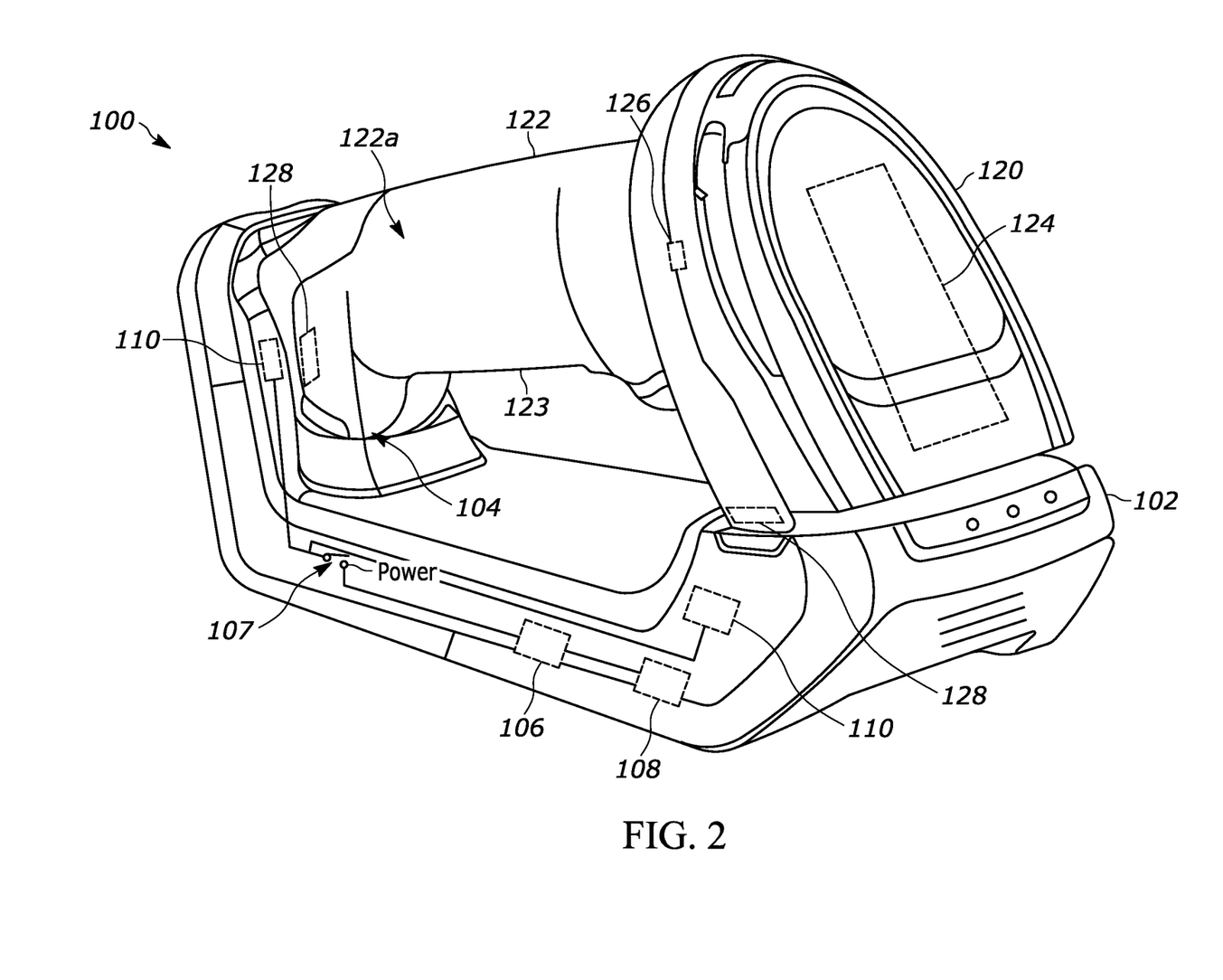
FIG. 2 illustrates a schematic view of the example scanning system of FIG. 1 in a first orientation accordance with various embodiments.
Figure 3:
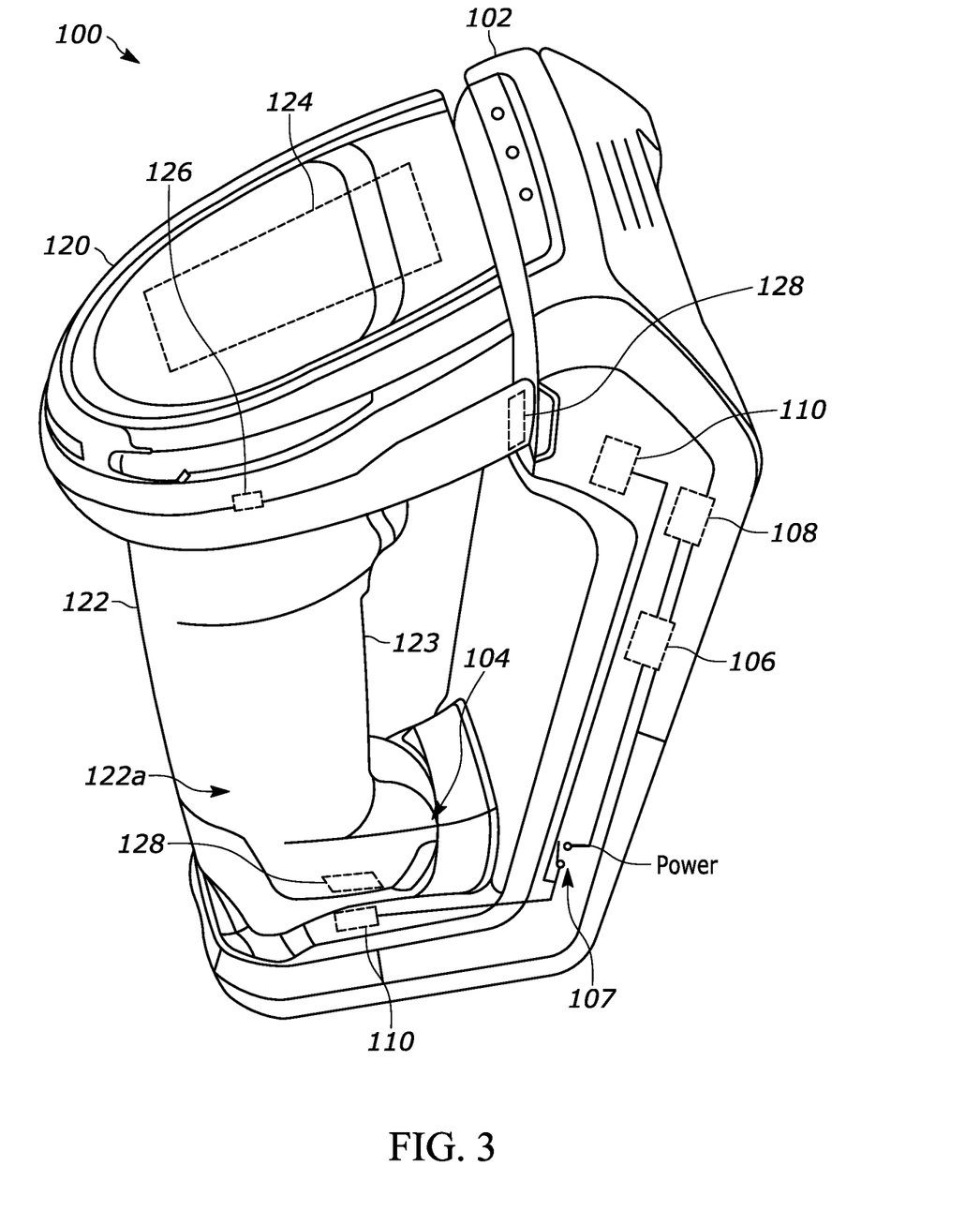
FIG. 3 illustrates a schematic view of the example scanning system of FIGS. 1 & 2 in a second orientation accordance with various embodiments.

Turning to FIGS. 1-3, a first example handheld scanning system 100 is provided for use in an environment 10. For example, the scanning system 100 may be used in a warehouse environment 10 in connection with machinery such as a forklift 12. Other examples are possible. The system 100 includes a cradle 102 and a barcode scanner 120 that may selectively couple with the cradle 102. The cradle 102 includes a cradle cavity portion 104 sized and dimensioned to receive a portion of the scanner 120, a cradle controller 106, a force sensor 108, and a first securing feature in the form of a cradle securing feature 110. The cradle 102 may be mounted or otherwise secured with the forklift at any number of desired locations such as, for example, on a dashboard region 14, a support beam 16, or any other suitable locations. While not illustrated any number of fasteners, adhesives, latches, and/or other locking mechanisms may be used to secure the cradle 102 with the forklift 12.

The cradle controller 106 is operably coupled with the cradle 102 (e.g., may be at least partially disposed therein) and is communicatively coupled with the force sensor 108 and the cradle securing feature 110. The cradle controller 106 may include any number of circuit boards, components, and/or subcomponents to perform electrical and/or electromechanical functions. The force sensor 108 may be in the form of an accelerometer and may be operably coupled with the cradle 102. Generally, the force sensor 108 is adapted to measure at least one characteristic of the cradle 102 while in the environment 10. More specifically, the force sensor 108 may be adapted to sense a change in a characteristic of the cradle 102 such as whether the cradle 102 is experiencing vibrations exceeding a threshold value. Such vibrations may occur when the cradle 102 is coupled with machinery such as the forklift 12. It is to be appreciated that the "threshold value" of vibrations will be determined based on specific characteristics of the environment 10 and/or the machine 12.

In these and other examples, the force sensor 108 may additionally or alternatively sense an orientation of the cradle 102. More specifically, the force sensor 108 may determine whether the cradle 102 is arranged horizontally (or within approximately 20° from the horizontal plane) or vertically (or within approximately 45° from the vertical plane). In any of these arrangements, the force sensor 108 may communicate with the cradle controller 106 via a wired and/or wireless communications protocol.

The cradle 102 may additionally include any number of cradle securing features 110. Depending on the arrangement of the system 100, the cradle securing feature or features 110 may be in the form of an active retention element. More specifically, in some examples, the cradle securing feature(s) 110 may be in the form of an electromagnet and/or an electropermanent magnet that is selectively powered upon receiving a signal from the cradle controller 106. In such examples, the cradle controller 106 may transmit a signal to a switch element 107 that causes the electromagnet(s) 110 to become activated or otherwise enabled. As will be discussed below, in such examples, the scanner 120 may carry any number of second scanner securing features 128 that couple with the cradle securing feature 110.

The cradle 102 may additionally include any number of features used to charge and/or transmit data to and from the scanner 120. In some examples, the cradle 102 may be capable of sensing whether the scanner 120 is mounted or otherwise coupled therewith. Other examples are possible.

The scanner 120 includes a housing 122 forming a scanner housing cavity 122a and further includes a grip portion 123. An imaging assembly 124, a scanner controller 126, and the scanner securing feature 128 are all at least partially disposed within or otherwise coupled with the scanner housing cavity 122a. Generally, the housing 122 is adapted to operably couple and/or nest within the cradle cavity portion 104 of the cradle 102.

The grip portion 123 is dimensioned to be grasped by a user and may include a trigger that activates the imaging assembly 124 to capture and/or decode the at least one image of an environment 10 appearing in a field of view (FOV) and includes an imaging sensor, a circuit board, and any number of additional components disposed within the scanner housing cavity 122a of the scanner 122. In some examples, the imaging assembly 124 may includes an optical assembly having elements for imaging the target object onto an image sensor. It is to be appreciated that the imaging assembly 124 may include one or more aspheric lenses, glass lenses, variable focus lenses, spatial filters, optical filters, apertures, bandpass filters, highpass filters, lowpass filters, notch filters, chromatic filters, neutral density filters, or another type of lens or optical element.

The scanner controller 126 is communicatively coupled with the imaging assembly 124 (and, optionally, the scanner securing feature 128) and may include any number of circuit boards, components, and/or subcomponents to perform electrical and/or electromechanical functions.

The scanner securing feature 128 may be in the form of a passive feature which selectively interacts with the cradle securing feature 110. In examples where the cradle securing feature 110 is in the form of an electromagnet and/or an electropermanent magnet, the scanner securing feature 128 may be in the form of a ferrous material that is magnetically attracted to (i.e., engages with the magnetic field of) the electromagnet upon the electromagnet being activated. In such examples, the electromagnet 110 may have any desired form such as, for example, a coiled arrangement, a disk arrangement and the like, and the ferrous material 128 may also have any desired form such as, for example, a disk, a puck, a block, and the like. As illustrated in the figures, a first scanner securing feature 128 is positioned at or near the front of the housing 122, and a second scanner securing feature 128 is positioned at or near the bottom or foot of the housing 122. Each of these scanner securing features 128 is positioned such that when the scanner 120 is coupled with the cradle cavity portion 104 of the cradle 102, they may selectively engage each other to retain the scanner 120 within the cradle cavity portion 104.

In operation, the cradle and scanner securing features 110, 128 may be configured in a normally-de-energized or inactive state where the cradle and scanner securing features 110, 128 do not engage each other. Upon the cradle 102 (e.g., the cradle controller 106, the force sensor 108, or an additional proximity sensor (not illustrated)) sensing the scanner 120 being coupled within the cradle cavity portion 104, the cradle controller 106 may cause the force sensor 108 to enter into a sensing mode in which excessive force and/or a specific orientation are monitored. While in this mode, the scanner 120 may be removed without resistance.

In the event the force sensor 108 senses a force exceeding a threshold value, the cradle controller 106 may transmit a signal to close the switch element 107 thereby causing the cradle securing feature 110 to activate or engage to magnetically or otherwise couple with the scanner securing feature 128 to retain the scanner 120 within the cradle cavity portion 104. Similarly, in some examples, upon the force sensor 108 entering into a sensing mode, an orientation of the cradle 102 may be determined. In the event the cradle is in a vertical or generally vertical orientation, the cradle controller 106 may transmit a signal to the close the switch element 107 thereby causing the cradle securing feature 110 to activate or engage to magnetically or otherwise couple with the scanner securing feature 128 to retain the scanner 120 within the cradle cavity portion 104. In some examples, the cradle 102 and/or the scanner 120 may include a release mechanism that causes the cradle securing feature 110 to become disabled when a user wishes to remove the scanner 120 from the cradle 102. As a non-limiting example, a power button or switch may be provided to cause the cradle securing feature 110 to become deactivated. In these examples, an additional proximity sensor (not illustrated) may be provided on the scanner 120 and/or the cradle 102 to sense a presence of a user's hand. Other examples are possible.

It is to be appreciated that in some examples, the active element (i.e., the electromagnet) may be disposed within or otherwise coupled with a portion of the scanner 120. In such examples, the components needed to activate the electromagnet may also be disposed within or otherwise coupled with a portion of the scanner 120. Further, in these examples, the ferrous material may be disposed within or otherwise coupled with the cradle 102 at or near the cradle cavity portion 104.

It is to be appreciated that the teachings described herein may be applied to any number of alternative scanning systems having varying characteristics. For example, with reference to FIG. 4, an alternative system 200 is provided that includes any number of features described in connection with FIGS. 1-3. Accordingly, such features will have similar two-digit suffixes as those described in FIGS. 1-3. Any number of elements described with respect to FIGS. 1-3 may be incorporated into the system 200 illustrated in FIG. 4, and vice-versa.

Figure 4:
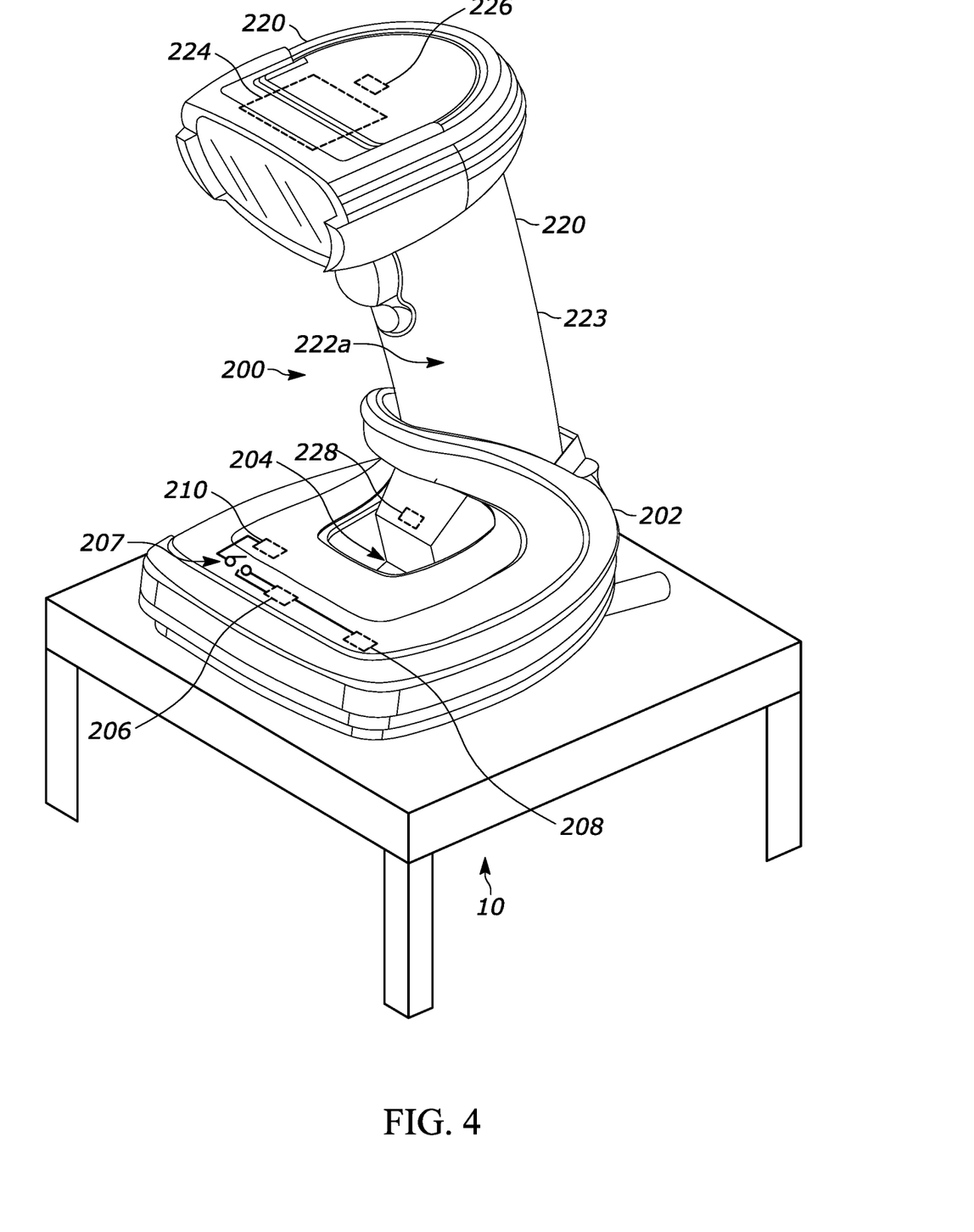
FIG. 4 illustrates a schematic view of an alternative example scanning system in accordance with various embodiments.

In this example, the cradle 202 is in the form of a presentation cradle that allows the scanner 220 to be used in an upright orientation. Such a system 200 may be used in retail environments 10 that incorporate a movable workstation. As with the system 100, in the system 200, the cradle 202 includes a cradle cavity portion 204, a cradle controller 206, a switch element 207, a force sensor 208, and a cradle securing feature 210. The scanner 220 includes a scanner housing 222 forming a scanner housing cavity 222*a*, a grip portion 223, an imaging assembly 224, a scanner controller 226, and a scanner securing feature 228. The switch element 207 may be in an open state or position when the sensed acceleration is below a threshold value (i.e., the workstation is stationary), but may transition to a closed state when the sensed acceleration is above the threshold value (i.e., when the workstation is moving) to cause the cradle securing feature 210 to become energized to engage with the scanner securing feature 228.

In some alternative examples, the cradle and scanner securing features 110, 128 may be in the form of a solenoid-activated mechanical latch feature. In such examples, the cradle securing feature 110 (or the scanner securing feature 128) may be in the form of a latch or hook that engages the scanner securing feature 128, which may be in the form of a corresponding catch, tab, or opening. Other suitable securing features may be possible.

In some examples, the electromagnet or electropermanent magnet may be operably coupled with the cradle housing via a bracket member, a clip feature, and/or an adhesive. Other examples are possible. By placing the electromagnet or electropermanent magnet within the cradle cavity, coupling with the scanner may be maximized by taking advantage of any mechanical leverage provided by the various components. As such, the size of the electromagnet and the scanner retention feature may be reduced.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A scanning system, comprising:
 a cradle including a cradle cavity portion, a cradle controller, a force sensor communicatively coupled with the cradle controller, and a first securing feature positioned at or near the cradle cavity portion and being communicatively coupled with the cradle controller; and
 a barcode scanner including:
  a housing having a scanner housing cavity,
  an imaging assembly adapted to capture an image of an environment appearing in a field of view (FOV), the imaging assembly being at least partially disposed within the scanner housing cavity,
  a scanner controller adapted to control operation of the imaging assembly, and
  a second securing feature;
 wherein in response to the force sensor sensing vibration exceeding a threshold value and/or the cradle being mounted in a predetermined orientation, the first and the second securing features are adapted to selectively interact to retain the barcode scanner within the cradle cavity portion.

2. The scanning assembly of claim 1, wherein one of the first or the second securing features includes a magnetic element, and the other of the first or the second securing features includes a magnetic or ferrous material.

3. The scanning assembly of claim 2, wherein the magnetic element is an active electromagnetic element or an electropermanent magnet.

4. The scanning assembly of claim 1, wherein one of the first or the second securing features includes a latch, and the other of the first or the second securing features includes a cavity adapted to at least partially receive the latch.

5. The scanning assembly of claim 1, wherein in response to the force sensor sensing vibration exceeding excessive value and/or the cradle being mounted in a predetermined orientation, the cradle controller causes the first securing feature to activate.

6. The scanning assembly of claim 5, wherein the force sensor includes an accelerometer.

7. The scanning assembly of claim 5, wherein the force sensor communicates with the cradle controller via a wireless communication protocol.

8. A cradle adapted to interface with a barcode scanner having a second securing feature, the cradle comprising:
 a cradle housing having a cradle cavity portion adapted to receive the barcode scanner;
 a cradle controller;
 a force sensor communicatively coupled with the cradle controller; and
 a cradle securing feature communicatively coupled with the cradle controller, wherein in response to the force sensor sensing a vibration exceeding a threshold value and/or the cradle being mounted in a predetermined orientation, the cradle controller causes the cradle securing feature to activate to retain the barcode scanner within the cradle cavity portion of the cradle housing.

9. The cradle of claim 8, wherein cradle securing feature includes a magnetic element or a magnetic or ferrous material.

10. The cradle of claim 9, wherein the magnetic element is an active electromagnetic element or an electropermanent magnet.

11. The cradle of claim 8, wherein the cradle securing feature includes a latch or a cavity adapted to at least partially receive the latch.

12. The cradle of claim 8, wherein the force sensor includes an accelerometer.

13. The cradle of claim 8, wherein the force sensor communicates with the cradle controller via a wireless communication protocol.

14. The cradle of claim 8, wherein the cradle controller is disposed in at least one of the cradle or the barcode scanner.

15. A method of selectively retaining a barcode scanner within a cradle cavity of a cradle, the method comprising:

provuding a cradle including a cradle cavity portion, a cradle controller, a force sensor communicatively coupled with the cradle controller, and a first securing feature positioned at or near the cradle cavity portion and being communicatively coupled with the cradle controller;

providing a barcode scanner including a housing having a cavity, an imaging assembly adapted to capture an image of an environment appearing in a field of view (FOV), the imaging assembly being at least partially disposed within the cavity of the housing, a scanner controller adapted to control operation of the imaging assembly, and a second securing feature;

sensing, via the force sensor, vibration exceeding a threshold value and/or the cradle being mounted in a predetermined orientation;

in response to the force sensor sensing vibration exceeding a threshold value and/or the cradle being mounted in a predetermined orientation, activating, via the cradle controller or the scanner controller, the first or second securing feature to engage the respective second or first securing feature to retain the barcode scanner within the cradle cavity portion.

16. The method of claim 15, wherein the force sensor communicates with the controller via a wireless communication protocol.

* * * * *